(12) United States Patent
Thoelke

(10) Patent No.: US 7,690,007 B2
(45) Date of Patent: Mar. 30, 2010

(54) MAPPING OF DYNAMIC LINK LIBRARIES IN A COMPUTING DEVICE

(75) Inventor: Andrew Thoelke, Hitchin (GB)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/595,549

(22) PCT Filed: Oct. 28, 2004

(86) PCT No.: PCT/GB2004/004551

§ 371 (c)(1),
(2), (4) Date: Jan. 8, 2007

(87) PCT Pub. No.: WO2005/052790

PCT Pub. Date: Jun. 9, 2005

(65) Prior Publication Data

US 2007/0220508 A1    Sep. 20, 2007

(30) Foreign Application Priority Data

Oct. 28, 2003   (GB)   ................... 0325145.1

(51) Int. Cl.
G06F 9/44   (2006.01)

(52) U.S. Cl. .................. 719/331; 719/332; 719/310; 717/162; 717/163

(58) Field of Classification Search ......... 719/331–332, 719/310; 717/174, 162–163
See application file for complete search history.

(56) References Cited

U.S. PATENT DOCUMENTS

| | | | | |
|---|---|---|---|---|
| 5,916,308 A | * | 6/1999 | Duncan et al. ............ | 719/331 |
| 6,052,778 A | | 4/2000 | Hagy et al. | |
| 6,292,843 B1 | * | 9/2001 | Romano ................. | 719/331 |
| 6,324,687 B1 | * | 11/2001 | Beadle et al. ............ | 717/148 |
| 6,351,779 B1 | * | 2/2002 | Berg et al. ................ | 710/5 |
| 6,442,752 B1 | | 8/2002 | Jennings et al. | |
| 6,567,093 B1 | * | 5/2003 | Tai et al. ................. | 345/519 |
| 6,658,658 B1 | * | 12/2003 | Jones et al. .............. | 717/162 |
| 6,804,709 B2 | * | 10/2004 | Manjure et al. .......... | 709/220 |
| 6,865,735 B1 | * | 3/2005 | Sirer et al. ............... | 717/158 |
| 6,874,148 B1 | * | 3/2005 | Richardson et al. ...... | 719/328 |
| 7,013,423 B2 | * | 3/2006 | Blaschke et al. ......... | 715/501.1 |
| 7,506,316 B2 | * | 3/2009 | Vertes ...................... | 717/130 |
| 2003/0065743 A1 | * | 4/2003 | Jenny et al. .............. | 709/219 |

(Continued)

FOREIGN PATENT DOCUMENTS

EP    0908817    4/1999

(Continued)

OTHER PUBLICATIONS

"Forwarder Dynamic Link Libraries as a Method for Servicing Software," IBM Technical Disclosure Bulletin, Nov. 1995, pp. 407-408, vol. 38 No. 11.

Primary Examiner—Meng-Ai An
Assistant Examiner—Jennifer N To
(74) Attorney, Agent, or Firm—Saul Ewing LLP

(57) ABSTRACT

A dynamic link library (DLL) in a computing device is provided in the form of a first part and an extension part. The first part has selected entry point ordinals by which an application program may link to first functions. The application program may only link to further functions via the extension part of the DLL.

7 Claims, 5 Drawing Sheets

U.S. PATENT DOCUMENTS

| | | | |
|---|---|---|---|
| 2003/0154192 A1* | 8/2003 | Laborde et al. | 707/3 |
| 2004/0003346 A1* | 1/2004 | Blaschke et al. | 715/501.1 |
| 2004/0077309 A1* | 4/2004 | Brass et al. | 455/7 |
| 2004/0123308 A1* | 6/2004 | Idoni | 719/331 |
| 2004/0255273 A1* | 12/2004 | Chan | 717/120 |
| 2004/0267920 A1* | 12/2004 | Hydrie et al. | 709/223 |
| 2004/0268213 A1* | 12/2004 | Chan | 715/500 |

FOREIGN PATENT DOCUMENTS

| | | |
|---|---|---|
| FR | 2820221 | 8/2002 |
| GB | 2354851 | 4/2001 |

\* cited by examiner

MAPPING OF DYNAMIC LINK LIBRARIES IN A COMPUTING DEVICE

CROSS REFERENCE TO RELATED APPLICATIONS

This application claims the priority of GB 0325145.1 filed Oct. 28, 2003 and PCT/GB2004/004551, filed on Oct. 28, 2004.

BACKGROUND OF THE INVENTION

The present invention relates to a method of accessing data in a computing device and, in particular to a method of accessing data held in a dynamic link library in the computing device. The present invention also relates to a computing device controlled by the method.

The term computing device as used herein is to be expansively construed to cover any form of electrical device and includes, data recording devices, such as digital still and movie cameras of any form factor, computers of any type or form, including hand held and personal computers, and communication devices of any form factor, including mobile phones, smart phones, communicators which combine communications, image recording and/or playback, and computing functionality within a single device, and other forms of wireless and wired information devices.

Most computing devices operate under the control of an operating system. The operating system can be regarded as the software that enables all the programs to be run on the computing device and can be key to greater operating efficiency and easier application development.

An operating system manages the hardware and software resources of the computing device. These resources include such things as the central processor unit (CPU), memory, and the disk space, if a disc forms part of or is used in conjunction with the computing device. As such, the operating system provides a stable, consistent way for applications running on the computing device to deal with the hardware resources of the computing device without the application needing to know all the details of the physical resources available to the hardware.

This task of managing the hardware and software resources is very important, because various programs and input methods compete for the attention of the CPU and demand memory, storage and input/output (I/O) resources for their own purposes. In this capacity, the operating system ensures that each application program is provided with the necessary resources, but always has due regard to the finite physical resources available to the device. An application program can be regarded as a complete, self-contained program that performs a specific function directly for the user of the device.

Another task that may be performed by the operating system is that of providing a consistent application program, or executable, interface (API). This is especially important if there is to be more than one of a particular type of computer using the operating system, or if the hardware making up the computer is ever open to change. This is particularly the case when the core operating system has several different users, such as can typically occur with computing devices in the form of wireless communications devices, such as smart phones.

With these devices it is not uncommon for various device manufacturers and device suppliers to adopt certain components of a core operating system as common components, but to tailor other components of the core operating system to their respective device requirements. It is pointed out that one distinction between an application program and the operating system is that applications run in 'user mode' (non-privileged mode), while operating systems and related utilities usually run in 'supervisor mode' (privileged mode). Hence, even in the smart phone example above, there are certain important components of the operating system, often referred as kernel components, that are maintained exclusively in the "supervisor mode"

A consistent application program interface (API) allows an application program for one computing device to run on another computing device of the same type, notwithstanding that the amount of memory or the quantity of storage is different on the two devices. Even if a particular computing device is unique, the operating system can ensure that application programs continue to run when hardware upgrades and updates occur, because the operating system and not the application program is responsible for managing the hardware and the distribution of its resources.

To further the efficient use of the device resources, certain functions and modules which may be common to a number of application programs may be stored in the form of a library so that these functions and modules are only stored once and not replicated in each of the application programs with which they are to be used. The contents of the library are therefore selectively linked to the application programs when they are loaded or run rather than being compiled within the individual application programs themselves. It follows that the same block of library code representing a function or module can be shared between several tasks to run on the device rather than each task containing copies of the routines it uses.

These libraries link dynamically with the application programs as the programs are run and therefore the libraries are commonly known as dynamic link libraries (DLLs). Hence, most modern computer operating systems provide a dynamic link library facility that enables certain executable procedures and functions to be provided in the form of a library that is separate from the application programs that execute on the computing device. Typically, an application program is dynamically linked to the library at run-time, so that the application program can call one or more of the procedures and functions that are exported by the library. Exported procedures are commonly referred to as entry points into the library.

Unlike regular application programs, which are generally executed from the beginning, a DLL can be entered at any entry point. There are two main ways of identifying these entry points into a DLL. The first option is to refer to the entry points by name. The second option is to refer to the entry points by ordinal number. This latter option is frequently referred to as function ordinal mapping or function ordinal linking. Names are potentially long in comparison to ordinals and require additional code for their definition. Therefore, the use of names is generally considered to be wasteful of the Read Only Memory (ROM) and Random Access Memory (RAM) resources of the computing device in comparison to the use of ordinal numbers. Ordinal linking of the access points is therefore the preference in certain operating systems, and particularly in those operating systems for use in smart phones because these types of computing devices have very restricted physical resources in comparison to those available in desktop or portable PC devices, and therefore the efficient use of code is of paramount importance.

DLLs provide, therefore, a way by which application programs can be provided in modular format so that functionality can be updated and reused more easily. They also help reduce memory overhead when several applications use the same functionality at the same time, because although each application is provided with a copy of the data, they can share the code. Furthermore, the dynamic linking allows a module to include only the information needed to locate an exported DLL function at load time or run time.

There is an increasing requirement for operating systems to provide a combination of compatibility with customisability. This is particularly the case with smart phone operating systems, such as the Symbian OS™ operating system supplied by Symbian Limited of London, England. Typically, such an operating system is supplied to handset manufacturers, who subsequently provide additional device functionality for operation under the control of the operating system. This means that an operating system of this type must maintain Binary Compatibility in its APIs, whilst at the same time allowing derived platforms and products to add innovative and differentiating functionality to these APIs in order to customise the operating system to the requirements of the respective handset manufacturers.

However, there are difficulties associated with coordinating the DLL entry points as an operating system of this type evolves from one release to the next.

In a first aspect, the present invention seeks to provide a method of providing a dynamic link library in a computing device in which these problems are substantially alleviated.

Accordingly, there is provided a method of providing a dynamic link library for providing functions for use by an executable program in a computing device, the method comprising providing the dynamic link library as a first part having first locations from which one or more first functions may be accessed for use by the executable program, and an extension part for enabling the executable program to access one or more further functions additional to the one or more first functions and located in the first part at locations additional to the first locations.

In a second aspect of the present invention there is provided a computing device operating according to the method of the first aspect.

According to a third aspect of the present invention there is provided computer software arranged to cause a computing device to operate in accordance with the first aspect.

BRIEF DESCRIPTION OF THE DRAWINGS

An embodiment of the present invention will now be described, by way of further example only, with reference to the accompanying drawings in which.

DESCRIPTION OF THE PREFERRED EMBODIMENT

Figure 1:
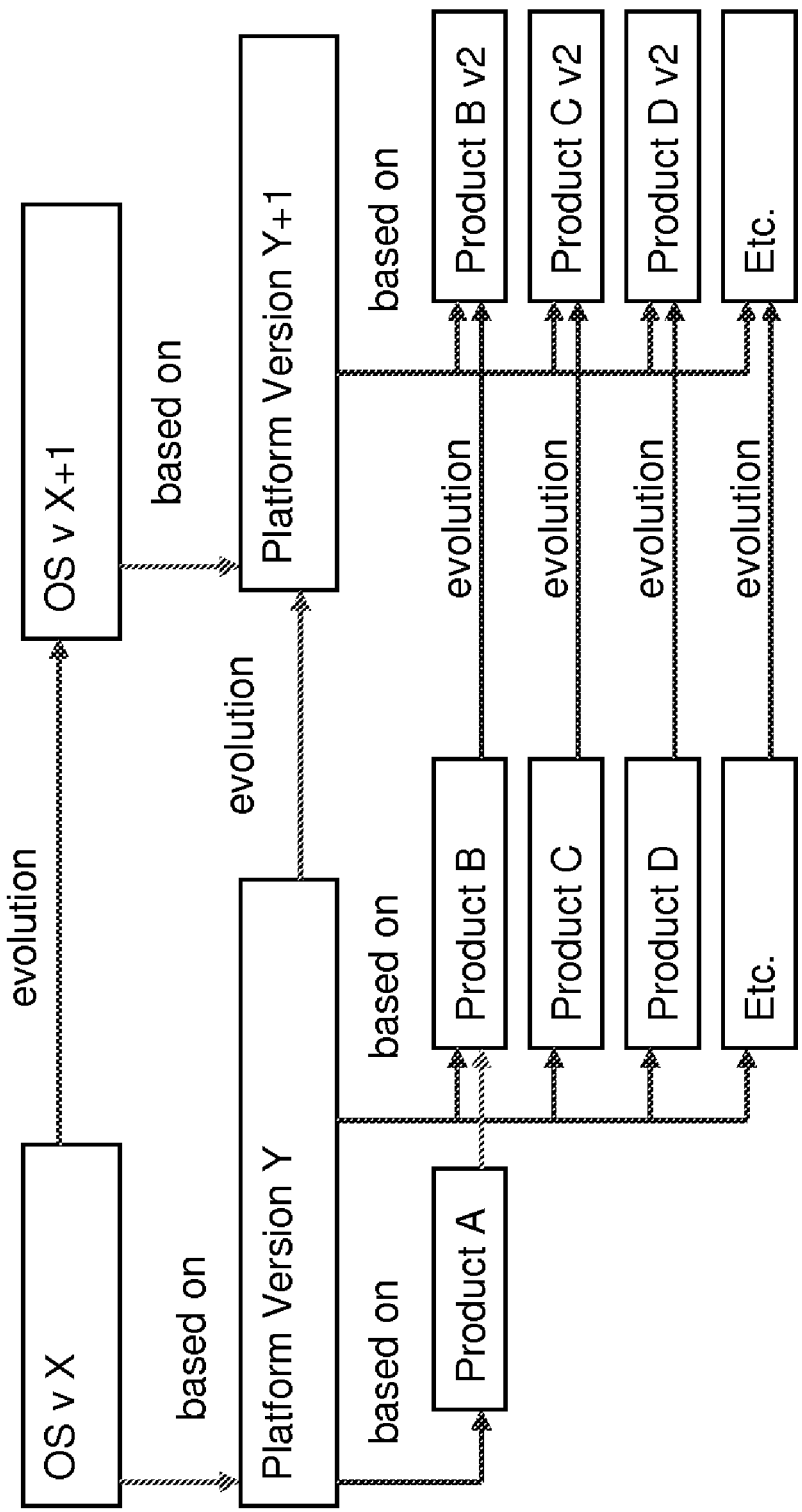
FIG. 1 is a diagram showing schematically smart phone platform evolution.

Referring to FIG. 1, an example is shown of a typical evolution of a smart phone. For clarity, this evolution is shown in the form of a family tree. The figure shows a small part of the evolutional "family tree", but the key point about this example is that there is no single linear evolution path from one release of an entity to the next.

It can be seen from the example of FIG. 1 that the operating system evolves from OS version X to OS version X+1. But, in parallel the device platform, which typically may be the device user interface, evolves from platform Y to platform Y+1, with platform Y being based on OS version X and platform Y+1 being based on OS version X+1. Product A evolves into product B, and these are both based on platform Y. Product B then evolves into product B version 2, but this is based on platform Y+1. This is because at each level of the evolution there has been a requirement to add functionality to the basic platform.

There is an additional requirement to maintain that functionality in future versions of that level of the family. This means there are multiple routes through which functional growth can occur. For example, a particular product will need to inherit additional functionality from the OS transition, from the platform transition, and from its product predecessor.

Multiple functional inheritance routes cause immediate platform fragmentation if the operating system uses an ordinal linking scheme to export functions from the DLL. With this type of scheme each function exported by the DLL is numbered sequentially. A client application of the DLL calls the functions for export by this ordinal number. The lookup between functions and ordinals may be defined in a definition (.DEF) file of the application concerned. However, this sequential numbering scheme means that if two parties make respective function additions to the same API without knowledge of the other, the function added by each party will be given the same ordinal number (at the end of the used ordinal number range). This means that program code built against the DLL modified by a first of the two parties (party one) will use that ordinal number to access the functionality thought to exist at the ordinal number concerned in the version of the platform developed by party one.

Figure 2:
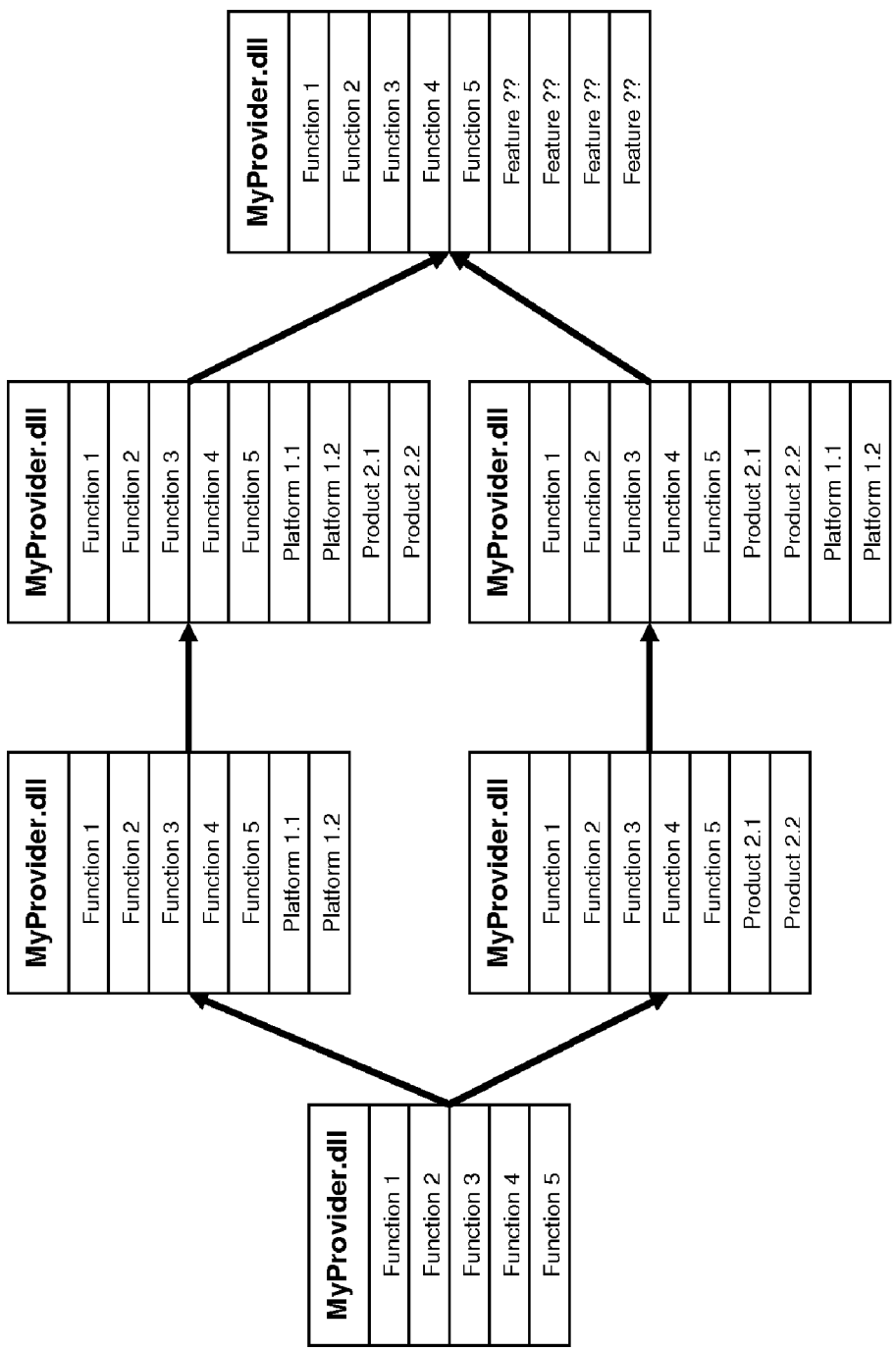
FIG. 2 is a diagram showing schematically how conflict can arise between ordinals of a DLL with parallel platform evolution.

However, the problems begin if that program code is ever run against the version of the platform developed by the other of the two parties (party two), since the function at that ordinal number developed by party one is not the same as the function at the same ordinal number as developed by party two. Once this problem has occurred in a released product, there is no way to correct it without breaking binary compatibility in one or the other platform. FIG. 2 illustrates what happens when an API is extended independently by two parties in parallel, and how the resulting ordinal space cannot be resolved.

The use of multiple routes of functional inheritance does not pose a problem so long as each API has a single inheritance route. In practice this means a single owner for each API. An owner is allowed to add to a respective API; nobody else is. This means that the API evolves in a linear fashion. For example, taking the Symbian OS™ operating system as an example, DLLs owned and provided by Symbian would only be extendable by Symbian, and would not be extendable by developers of derivative platforms or products. However, in practice this ideal of not allowing extension to interfaces other than by the interface owner is at variance with the increasing need to provide customisation of platforms and products from a common core operating system.

Because of the continuing need to develop new products and to bring these to market in the shortest time frame possible, it is relatively commonplace that various products will be under development by a first party, but which have added functionality to interfaces owned by one or more other parties. For example, this could occur if a platform developed by one party adds an API to one or more libraries owned by another party, or if a product adds an API to one or more platform libraries; the problem is the same in either case.

It is emphasised that the problem is not that compatibility with the underlying platform has been broken. In each case the product would be compatible with the current operating system/user interface (OS/UI) platform. The problem is that if a future revision of the product is made, based on a later version of that OS/UI platform, it can only be compatible with either the new version of the platform, or the previous version of the product, but not both. However, the requirements are that compatibility with both is essential in order not to fragment the platform. Such fragmentation would be very damaging to the operating system and very difficult to recover from.

Hence, a provider of an OS may be faced with a scenario in which;
the OS provider is adding substantial functionality to its APIs in new versions of the OS (legitimately)
UI platform providers are adding considerable functionality to their APIs in new versions (legitimately)
Product manufacturers are adding functionality to the OS and UI platform APIs in their products, and this is not unreasonable to expect because these products require differentiation and flexibility from the platform.

However, because the functional additions by each of the above parties are added at the end of the ordinal number range, the functional additions of the product manufacturers will be in the same ordinal space as the UI platform additions provided by the UI platform provider, which in turn will be in the same ordinal space as the additional functionality provided by the OS provider. Thus, there is potential for conflicts within the ordinal space, of an unknown scope and from an unknown source. The reason the scope is unknown is that much of the work being conducted on a platform by the product manufacturer in order to realise new products is not necessarily visible to either the OS or the UI platform providers.

In reality, this situation does not become damaging until two products, or software development kits (SDKs) through which the products are developed, become available in the market place with conflicting ordinals. Until that time it is possible to correct products & SDKs which are not released into the marketplace.

Hence, the present invention seeks to provide a system which enables users of the system to add functionality to APIs in a safe, extensible way without endangering future compatibility. In this manner, a third party may add functionality to an existing API, and in particular to an API which is linked by ordinal, in a way which does not compromise future evolution of that API. A second objective is that any future evolution of the original API which does occur will not compromise the third party added functionality.

The present invention is applicable to any situation where a third party requires to add functionality to an existing API which is not owned by that party. It does not apply when the owner of an API is extending that API, because by definition the owner is the maintainer of the API. The present invention can also be used to remove further potential for conflict where additions have already been made to an API by a third party.

Figure 3:
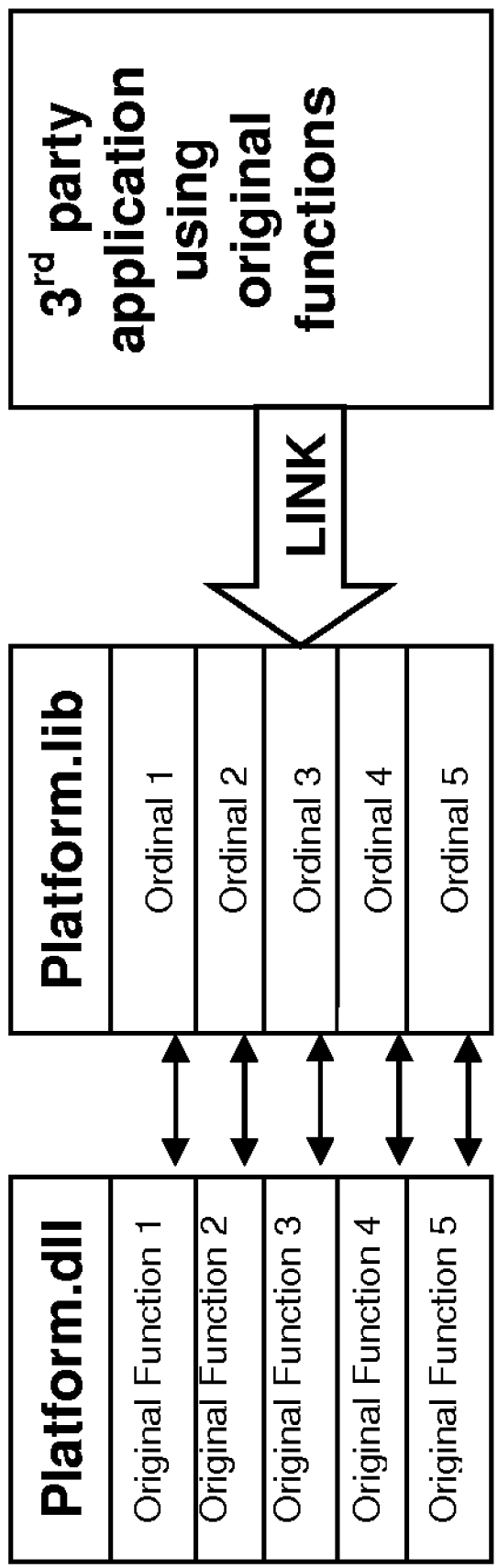
FIG. 3 is a diagram showing schematically how an application on a smart phone can access original functions from a DLL.

FIG. 3 shows an application linking to Original Functions stored against a library extension (LIB) of a platform DLL. The application uses the functions stored in the DLL via the LIB file ordinals. Therefore, when the application calls for Original Function 1, a link is provided to ordinal 1 of the library extension which in turn exports the functionality provided by Original Function 1 for use by the application; and so on for the remaining Original Functions stored at other ordinals in the DLL. This is a known pattern of DLL linkage and is employed, for example, in the Symbian OS™ operating system.

Figure 4:
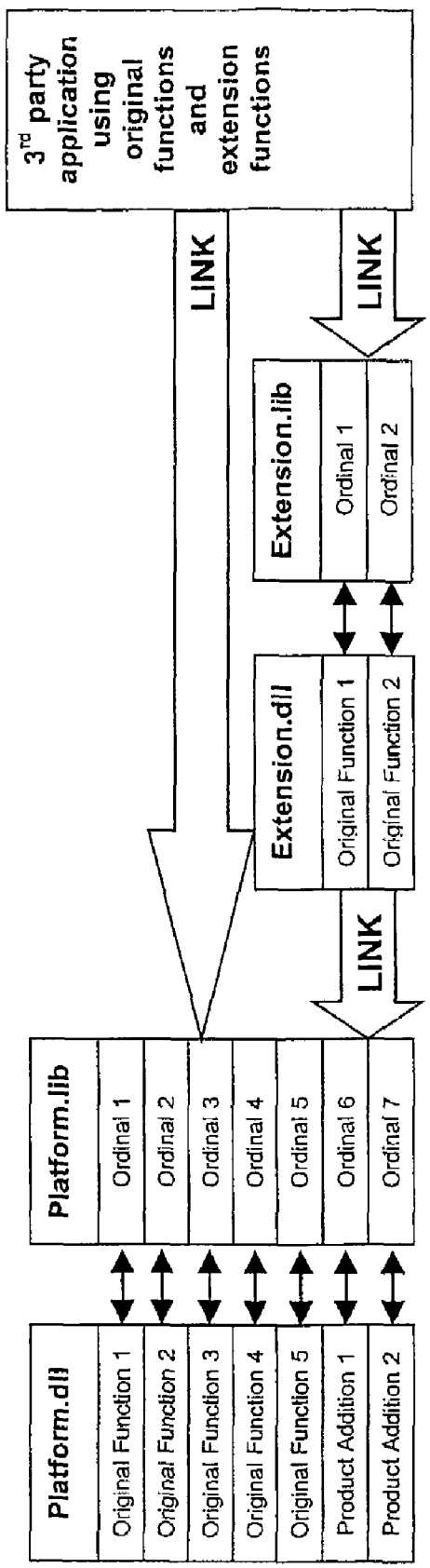
FIG. 4 is a diagram showing how a DLL can be provided in accordance with the method of the present invention.

FIG. 4 illustrates how an Extension DLL pattern may be used by an application for some product addition functions which have been added to the Original Functions provided from the platform DLL. These product additions are exported from the platform DLL via additional ordinals 6 and 7. However, these additional ordinals 6 and 7 are not linked to directly by the application but via the extension DLL. The extension DLL is actually accessed via an extension library holding the ordinal addresses for the extension DLL, in a similar manner to the access route for the platform DLL. With the present invention, it is not permitted for the application to use the additional ordinals from the platform DLL directly. But, as can be seen from FIG. 4, the application is permitted to use the Original Functions 1 to 5 by exporting them directly from the platform DLL. This is because the Original Functions are known both to the operating system and the application to be exportable from the DLL via, respectively, ordinals 1 to 5 for use by the application.

Many operating systems are now written using an object orientated programming code, such as C++. With such a system, a preferred way to achieve the method of the present invention is to implement the product addition functions as private members of classes. This means that the C++ compiler will enforce client code to use the extension DLL. Furthermore, it is well known in this art that changes to code originally written by another party should be kept to a minimum. Hence, in keeping with best practice followed in this art, the extension DLL need not be provided purely as an adapter for linking to the platform DLL, but may also be arranged to contain the majority of extra code required to provide the additional functionality for the application programs. Moreover, the extension DLL may be provided in a way such that it is not specific to a single Platform DLL. Hence, it is envisaged that a single "Product Extension" DLL may be provided in the ROM of the computing device, but this single extension DLL is arranged to provide the interface to the additional functionality of more than one, and perhaps even all of the platform DLLs. Hence, it is stressed that the method of the present invention is not restricted to the provision of a respective extension DLL for each platform DLL. It follows that a product manufacturer may choose to add a single extension DLL to provide a link to several platform DLLs, or the additional functionality (extension functions) may be provided by arranging the extension DLL as an actual extension to an existing product DLL. Alternatively, the extension functions may be grouped in a manner that bears no relationship to the arrangement of the original platform DLLs.

In the arrangement shown in FIG. 4, therefore, the third party application is linked to Ordinals 1 to 5 of Platform.lib, the library extension of the platform DLL, and ordinals 1 & 2 of extension.lib, the library extension of the extension DLL. As far as the application is concerned, it has no visibility of ordinals 6 & 7 of Platform.lib. As a result, a third party SDK for the product does not even need to contain the extended version of Platform.lib. Therefore, with the present invention it is possible to substitute the original (ordinals 1 to 5) version of the library extension Platform.lib in the SDK, and only use the extended (ordinals 1 to 7) version of the library for platform development. This means that there is no possibility of code produced by the third party using the additional ordinals 6 and 7.

Figure 5:
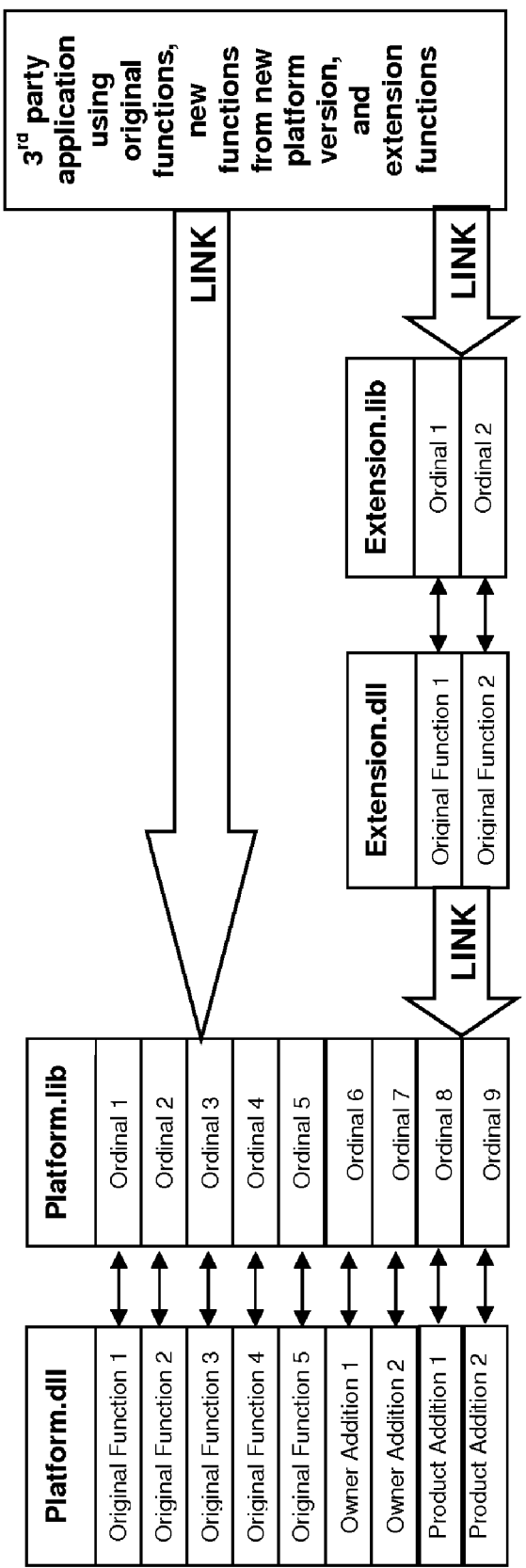
FIG. 5 is a diagram showing how an application can access a function from a modified DLL using a DLL extension provided in accordance with the method of the present invention.

FIG. 5 shows a later version of the platform, when the owner of the platform DLL has added some more core functionality to the API of the platform DLL. In this case Ordinals 6 & 7 have now been used by the owner in adding the new functions. Problems would now arise if the application linking to this platform DLL was expecting to see Product Additions 1 and 2 at these ordinals, as in the platform version shown in FIG. 4, because ordinals 6 and 7 are now used, respectively, to export Owner Additions 1 and 2. However, in this case the problems are avoided since the Product Addition functions 1 and 2 are always called via the extension DLL. Therefore it is acceptable for these functions each to move to a different ordinal position. In FIG. 5, Product Additions are moved, respectively, from ordinals 6 & 7 to ordinals 8 & 9. The only component of the system that links to the ordinals for Product Additions 1 and 2 is the extension DLL, and therefore this must be rebuilt. No code changes are necessary, just a re-link in order for the extension DLL to point at the new ordinal positions 8 and 9 used to export Product Additions 1 and 2 to the application. Because the third party application code is linking to Extension.lib, and these ordinals remain the same, the third party code does not need to be rebuilt.

An example of program code for implementation of the embodiment of the present invention as illustrated in FIG. 5 may be as follows. It is pointed out that the following example is a relatively simple indication of how the source code to implement the present invention may be achieved.

The following code extract shows how a function could be added to a header file of a platform DLL. In this example, there are two functions added to the header. The public ExtensionFunction will be implemented in the Extension DLL. It will therefore not be exported from Platform.dll, but from Extension.dll. The private DoExtensionFunction will be implemented in the Platform.dll and therefore will be exported from Platform.dll. This function is made private so that the compiler will prevent third party code from calling this function through its ordinal export.

```
//PlatformDll.h
Class CMyClass : public CBase
    {
public:
    // The supplied API of the class
    ...
    // Product additional functions
    // This public exported function will be implemented in the extension DLL
    IMPORT_C     void ExtensionFunction ( );
private:
    // This private exported function will be implemented in the platform DLL
    IMPORT_C     void DoExtensionFunction ( );
    }
```

The implementation in the platform DLL is to add the code for DoExtensionFunction. This should contain the minimum of code necessary for this extension function to be included in the DLL, so as to minimise the amount of change required. This function will be exported in Platform.lib.

```
//PlatformDll.cpp
...
CMyClass::DoExtensionFunction( )
    {
    ...
    // implementation of the required functionality
    ...
    }
```

The implementation in the extension.dll is primarily to enable the call through to the private DoExtensionFunction in the platform DLL. DoExtensionFunction is private, so can only be called from within the same class. Note that the call to DoExtensionFunction is surrounded by other code which does not need to be in the platform.dll, and therefore is implemented here to minimise the impact on the platform DLL.

```
//ExtensionDll.cpp
CMyClass::ExtensionFunction( )
    {
    ...
    // implementation of functionality that does not have to be in platform.dll
    ...
    DoExtensionFunction( );
    ...
    // implementation of functionality that does not have to be in platform.dll
    ...
    }
```

Preferably, the code should also ensure that only essential changes are made to the platform DLL. Therefore, all other functionality should preferably be implemented in the extension DLL. This provides the additional benefit that there is less chance of clashing functionality arising from subsequent changes to the platform, and thus future integration of newer platforms will be less troublesome.

Also, if any extension functions are provided in the platform DLL, these should preferably be made as private functions. This makes it more difficult for a third party to inadvertently use an extension function in the original API rather than in the extension DLL. The compiler will then help to enforce the rule that has been established.

Furthermore, it is also preferable that a publicly released SDK should only include the original LIB files as supplied. This would mean that third party code could not possibly call any of the platform additional ordinals, as they are not present in the LIB files. A third party therefore would have no choice but to access the extension functionality via the extension DLL, and therefore would not encounter compatibility problems with future platforms.

By making extension functions private, and excluding the modified libraries from the SDK, third party code is prevented from calling the product additional functions created by the provider of the platform DLL. However, it is also preferable to ensure that ROM code within a device also uses the extension DLLs. Hence, by restricting the SDK to the original LIB files it is not only third parties that must use the extension DLL to access the additional functions, but also all code, i.e. ROM code, that is subsequently incorporated into the device. Although ROM code can be rebuilt at some future point in time against new LIB files, it is preferable and highly desirable to maximise binary compatibility wherever possible and at all times during the lifecycle of any particular device. It follows that this compatibility can be enabled if the extension DLL of the present invention is utilised in the above manner.

Although the present invention has been described with reference to particular embodiments, it will be appreciated that modifications may be effected whilst remaining within the scope of the present invention as defined by the appended claims. For example, although the method of the present invention has been described with reference to DLLs with ordinal linking, it can also be used with DLLs which link by name. Moreover, the additional functions for use by an application program may be provided in part within the platform DLL and in part within the extension DLL, and the extension DLL in this instance may be arranged to cause to link to an additional function in either the platform DLL or within the extension DLL itself. Furthermore, although the present invention has been described with reference to a computing device in the form of a smart phone, the present invention may also be used in other forms of computing devices, such as portable or desktop PCs, personal digital assistants (PDAs), or general computer systems.

The invention claimed is:

1. A method of operating a computing device having an operating system and a dynamic link library containing a plurality of functions accessible by an executable program, each function in the dynamic link library being associated with an ordinal number, the method comprising:
    configuring the computing device to provide the dynamic link library as a first part and an extension part, the first part and the extension part each containing one or more of the plurality of functions;
    executing the executable program using a processor of the computing device to cause the executable program to link to functions in the first part directly by means of the associated ordinal numbers; and
    executing the executable program using said processor of the computing device to cause the executable program to link to functions in the extension part indirectly via a further library containing additional functions.

2. A method according to claim 1 wherein the further library is arranged to link to a plurality of dynamic link libraries in the computing device.

3. A method according to claim 1 wherein said computing device uses a read only memory (ROM) code within the computing device, said ROM code being accessible only via the further library.

4. A method according to claim 1 wherein functions within the extension part are provided as private functions.

5. A method according to claim 1 wherein the one or more functions in the first part form part of the operating system.

6. A computing device for mapping dynamic link libraries, comprising:
    a processor coupled to a memory; and
    a dynamic link library stored in said memory and containing a plurality of functions accessible by an executable program, each function in the dynamic link library being associated with an ordinal number;
    wherein the processor is configured to:
        provide the dynamic link library as a first part and an extension part, the first part and the extension part each containing one or more of the plurality of functions;
        execute the executable program, using said processor, to cause the executable program to link to functions in the first part directly by means of the associated ordinal numbers; and
        execute the executable program, using said processor, to cause the executable program to link to functions in the extension part indirectly via a further library containing additional functions.

7. A computer-readable storage medium with an executable program stored thereon, wherein the program instructs a processor of a device to perform the following steps:
    creating a dynamic link library containing a plurality of functions accessible by the executable program, each function in the dynamic link library being associated with an ordinal number;
    providing the dynamic link library as a first part and an extension part, the first part and the extension part each containing one or more of the plurality of functions;
    executing the executable program to cause the executable program to link to functions in the first part directly by means of the associated ordinal numbers; and
    executing the executable program to cause the executable program to link to functions in the extension part indirectly via a further library containing additional functions.

* * * * *